United States Patent [19]

Reed

[11] Patent Number: 5,320,058
[45] Date of Patent: Jun. 14, 1994

[54] SELF-CONTAINED BOAT LAUNCHING ASSEMBLY AND METHODS

[76] Inventor: Waymon B. Reed, 318 Utah, Sherman, Tex. 75090

[21] Appl. No.: 994,704

[22] Filed: Dec. 22, 1992

[51] Int. Cl.⁵ ............................................. B60P 3/10
[52] U.S. Cl. .................................. 114/344; 280/414.1
[58] Field of Search ............... 114/344, 366; 414/491, 414/492, 494, 586; 280/414.1

[56] References Cited

U.S. PATENT DOCUMENTS

| | | | |
|---|---|---|---|
| 3,140,003 | 7/1964 | Horner | 280/414.1 |
| 3,682,335 | 8/1992 | Smyth | 414/506 |
| 3,848,892 | 11/1974 | Reder | 280/414.1 |
| 3,951,433 | 4/1976 | Starkey | 280/414.1 |

*Primary Examiner*—Jesus D. Sotelo
*Attorney, Agent, or Firm*—Hubbard, Tucker & Harris

[57] ABSTRACT

A self-contained trailer mountable boat launching assembly makes it possible for one person to launch a boat from a launching ramp. A small air compressor and accumulator tank are mounted on the trailer frame in combination with a control valve and an operating cylinder. A remote switch routes pressure from the tank through the control valve to operate the cylinder which provides a launching force on the prow of the boat. In one embodiment, the end of the operating cylinder is mounted to a flexible member having an open hook in the end which passes up and through a laterally extending eye on the prow of a boat. A roller aft of the hook changes direction of the flexible member to pull the boat off the trailer and allows the hook to automatically release from the eye as the boat moves in response to the operating cylinder rod moving opposite the launching direction. Linear movement of the hook is magnified by a mechanical advantage. In a second embodiment, the components which supply motive power to a cylinder are the same as in the first embodiment, but the cylinder operates directly against the prow of the boat. The end of the cylinder has a cushioning element which doubles as a stop. The prow of the boat is held in trailering position against the cushioning element when the cylinder is retracted. Lateral control of the boat can be maintained until launch is triggered by actuation of the cylinder.

56 Claims, 4 Drawing Sheets

SELF-CONTAINED BOAT LAUNCHING ASSEMBLY AND METHODS

BACKGROUND OF THE INVENTION

1. Field of the Invention

The invention lies in the field of marine accessories, more specifically, a device for self-unloading a boat from a trailer at a launching site into the water.

2. Background of the Prior Art

Boats are commonly stored on trailers for movement over the road to or between launch sites. The boat trailers are connected to the user's vehicle and hauled to a sloping ramp where boats are launched into the water. The operator backs the trailer into the water after having disengaged the safety strap hold-downs on the side of the boat and the usual winch line leading from a winch on the trailer to an eye on the prow of the boat.

Typically, one person gets into the boat in preparation for launching while another person operates the vehicle. The boat is supported on the trailer by a series of rollers or cushioned boards or combinations of rollers and supports such that it is necessary to back the trailer considerable distance into the water so that the boat can be floated off the trailer underneath. After the lower unit is properly submerged, the person in the boat uses the motor to back the boat away from the trailer. The reverse procedure is required for reloading the boat onto the trailer. The trailer is submerged, the boat driven up onto the center of the trailer, and the winch connected to the eye whereby the boat is pulled up against a stop pulled by the winch rope then the vehicle pulls the trailer out of the water. These procedures are generally applicable to small skiffs, runabouts, on up to large cruisers having multiple wheeled trailers.

The launching of such a boat by a sole individual becomes a difficult proposition because there is no one to put in the boat to operate the motor in order to get the boat safely away from the trailer so that the trailer can be removed from the water. After the trailer is backed far enough into the water to float the boat, the sole operator in almost all cases is faced with the unpleasant necessity of wading into the water in order to apply a force to the front of the prow of the boat in order to get it away from the trailer so that it can be safely launched and the trailer removed. A line is tied to the prow of the boat so that the operator can maintain control. By manipulating the line, the boat can be brought to the shore at a place where it does not interfere with other people launching their boats, and the trailer can then be removed. Wading into the water in this manner is unpleasant under any circumstances, excruciatingly uncomfortable in cold weather conditions, and unsafe as well. Sloping boat ramps are often covered with slimy algae which make even careful walking hazardous.

The process of launching the boat when you don't have a companion is hazardous to the boat and lower unit of the motor, as well. Except for the most protected launch ramps, wave action can pound the boat against the trailer frame as soon the trailer loses control of the boat. This happens as soon as the trailer is backed in the water far enough to float the boat off the trailer and continues during the interval before the sole vehicle operator can get to the boat to push it away from the trailer. The problem is exacerbated when larger boats, such as cruisers, are involved, because the boat and trailer are larger. It is more difficult for one person to push the boat away from the trailer and larger boats are more susceptible to expensive damage. Once the boat is floated the trailer or other obstacles can do damage to the boat because it was not pushed safely away before the operator could get out of the water and back into the vehicle to remove the trailer. Although some marinas have lifting devices which can be used to lift the boat while the trailer is removed, substantial charges and delays are encountered waiting for the lift. It would be desirable to have a self-contained trailer mountable marine boat-launching assembly that would allow an operator to safely launch a boat without assistance.

SUMMARY OF THE INVENTION

The boat-launching assembly of the present invention comprises a self-contained trailer mountable marine boat launching assembly to be carried by a trailer for hauling a boat to a launch site behind a pulling vehicle which conveniently makes it possible for one person to launch a boat into the water at a boat ramp. The launching assembly is operable to apply a launching force in a launching direction to the prow of a boat after the trailer has been backed into the launching position so that the stern of the boat is floating and the front portion of the boat at least partially still supported by the trailer on which it was hauled.

The boat may be said to have a trailering position which the prow of the boat is positioned against a fixed stop at the front of the trailer which orients the boat longitudinally with respect to the length of the trailer. The trailer conventionally has supports spaced from front to rear which support the bottom of a boat.

The launching assembly has a support structure which is mountable near the front of a trailer adapted to haul a boat in a trailering position of the kind which also permits launching of the boat off the trailer. The launching assembly includes a drive means, a power supply means and a control means adjustably mountable on the trailer. The drive means is mounted on the support structure for applying a launching force over the distance to the prow of a boat. A power supply means is connected to the drive means for supplying motive power to operate the drive means. The control means mountable on the trailer, is operatively interconnected with the drive means and the power supply means, for selectively operating the drive means by applying the motive power to the drive means to apply a launching force over a distance in a launching direction to the prow of a boat in response to a control switch which operates the control means. The control switch is preferably remotely located from the trailer so that one person can operate the device without the necessity of entering the water during the launching operation.

In a first embodiment of the invention, the drive means has an extendable operating rod which moves an operating distance in a direction opposite of the launching direction to apply the launching force to the prow of a boat. The drive means includes a flexible member and the operating rod having an operating end adapted to supply launching force to the flexible member which transfers the launching force applied by the drive means to the flexible member. The flexible member is releasably attachable to the prow of a boat.

The flexible member has a hook member on its end which is engageable with an eye member on the prow of a boat. The hook member automatically disengages from the eye member upon movement of the boat in a launching direction after application of the launching force to the boat by the flexible member.

The hook member is preferably an open hook resting on an eye fixed to the prow of the boat with the flexible member angled towards the stern and turned over a roller. Launching force is applied to the flexible member by the operating rod or actuating rod of the drive means while the hook member remains engaged with the eye on the boat. As the boat moves in a launching direction, the hook is securely engaged with the eye while power is being applied to the flexible member and thereafter continued movement of the boat reverses the open portion of the hook so that it can fall out of the eye by gravity. It is preferable to provide a tensioning device which supplies a tensioning force to prevent slack from developing in the flexible member before the launching force is applied so that the hook member remains engaged in the eye member. The tensioning device may be a spring-loaded reel around which a portion of the flexible member is wound, which allows the flexible member to be pulled out and extended if it is pulled slowly, but locks if force is suddenly applied.

The power supply means includes a pressure vessel mounted on the front portion of the trailer having a sufficient capacity to supply operating fluid to the operating cylinder of the drive means over at least one extension cycle. The control means interconnects the vessel with the operating cylinder. The power supply means includes an air compressor for filling the pressure vessel to a preselected operating pressure to provide the motive power to the drive means operating cylinder sufficient to apply launching force to a boat. The operating cylinder may be a double acting cylinder and the control means adapted to selectively extend the operating rod to apply the launching force and retract the operating rod after the launching force has been applied in response to operation of a switch which operates the control means. The air compressor is an electrically operated air compressor electrically connected to a wiring harness of the trailer and automatically powered up in response to the wiring harness of the trailer being plugged into the corresponding plug on the vehicle. It is electrically activated in response to the vehicle being started. Thus, when the vehicle is started, the air compressor automatically fills the tank to a preselected operating pressure and then shuts off. The control switch is remotely located with respect to the trailer on which the assembly is mounted so that it can operate the drive means through the control means from a distance without the necessity of the operator entering the water at the launching site. The control switch is preferably adapted for mounting within the vehicle that pulls the trailer and operatively connected to the vehicle electrical power system. This permits the operator, once the trailer is in the launching position, to activate the device by use of the switch.

The drive means may preferably have a member having an end releasably connected to the prow of a boat, adapted to be driven in a launching direction by the operating rod a magnified distance which exceeds a corresponding distance over which the operating rod moves, the member being driven over a greater distance than the operating distance of the operating rod. This permits the use of a cylinder with a smaller stroke with significantly reduced cost and space requirements. The operating rod has an operating end adapted to supply force to the flexible member over a distance which is greater than the operating distance of the operating rod wherein the movement of the operating rod is a fraction of the movement of the flexible member during launching. The fraction is preferably $\frac{1}{2}$. The assembly further preferably includes a flow restrictor which tends to control the flow of pressurized fluid between the pressure vessel and the operating cylinder while the launching force is being applied. The flow restrictor may be included in the control means or as part of the drive means or in the line connecting the control means and the drive means. The flow restrictor operates to control the time interval over which the cylinder extends in response to application of pressurized fluid to provide a smooth application of the launching force over a short time interval.

In a second embodiment, a launching assembly is mounted at the front of a trailer for selectively applying a launching force to the prow of a boat which is still in the trailering position after the boat is floated off the back of the trailer in response to backing the trailer into the water. The launching assembly includes a retractable actuator having an end provided with cushioning means for contact with the prow of a boat located in the trailering position. The cushioning means of the retracted actuator serves as a stop to define the trailering position in contact with the prow of a boat when the actuator is retracted. An actuating cylinder is provided for driving the actuator to an extended position in a launching direction away from the cylinder, thereby applying a launching force with the cushioning means to the prow of a boat over a distance in the launching direction during extension of the actuator.

The assembly of the second embodiment includes a power supply means for supplying motive power to the actuating cylinder to drive the actuator in response to operation of the control unit interconnecting the power unit and actuating cylinder, which selectively applies power from the power supply means to the actuating cylinder to generate launching force by the actuator in response to selective operation of an operating switch of the control unit. The assembly makes it possible to launch a boat by backing a trailer on which the unit is mounted into the water at the launch site to a point where the boat is partly floated up off the trailer at the stern but is still partially supported by the trailer and controlled by the weight of the portion supported by the trailer, in the trailering position, which can be accelerated away from the trailer in a launching direction by a launching force applied to the prow by the cushioned end of the actuator.

The actuating cylinder is operated by pressurized fluid, either hydraulic or preferably air, selectively applied by the power supply means through the control unit. The power supply means includes a pressure-producing pump means mounted on the trailer to provide said motive power by providing pressurized fluid to the actuating cylinder. The power supply means includes a vessel of sufficient capacity to store sufficient fluid to operate the actuating cylinder to drive the actuator to its extended position. Preferably, the pressure vessel is a pressure vessel for compressed air, and the power supply means includes an air compressor for filling the pressure vessel to a preselected operating pressure to provide the motive power to apply the launching force to a boat.

The air compressor is an electrically operated compressor electrically connected to a wiring harness of the trailer and automatically powered up in response to the wiring harness of the trailer being plugged into a corresponding plug on a vehicle, which is electrically activated in response to the vehicle being started. A control switch is remotely located with respect to the trailer in which the assembly is mountable so it can operate the actuating cylinder through the control means from a distance without the necessity of an operator entering the water a the launching site. A control switch is preferably mounted within the vehicle that pulls the trailer and operatively connected to the vehicle electrical power system. The launching assembly of the second embodiment preferably includes the flow restrictor which tends to control the flow of pressurized fluid between the pressure vessel and the actuator cylinder while the launching force is being applied. The flow restrictor makes it possible to slow down the extension of the actuator so that a smooth, powerful stroke is applied without any danger of damaging the boat. The force is preferably applied over a short time interval on the order of magnitude of about one half second to five seconds depending on the size of the boat and cylinder. The cushioning device is in the form of an open V which is maintained in a horizontal position by guide members which are located on either side of the actuating cylinder and slidingly support rods connected to the cushioning means. The launching assembly conveniently provides a place for mounting a conventional winch which is used to draw the boat back onto the trailer in the usual manner when the boat is being retrieved. The cylinder is a double-acting cylinder, and in the retractive position, the cushioning means provides a stop against which the prow is held by the conventional trailering winch.

The invention provides an inexpensive assembly which is installed on new trailers or retrofitted on old trailers for enabling the boat owner to conveniently and inexpensively launch his boat without assistance from other persons. The boat is launched using a method which permits the owner to effectuate the launch from the cab of his tow vehicle after the necessary over-the-road tie-downs and the winch cable is released from the boat. The trailer is backed into the water so that the boat is floated at the stern, but remains partially supported at the trailer at the front portion with the prow against the cushioning means of the second embodiment or a conventional stop fixed on the trailer in the conventional manner. Inasmuch as the motive power for launching is applied by means of a cylinder which drives the operating rod or actuator, it can be sized to provide very considerable launching forces in a launching direction in the case of heavy boats or cruisers. It is not necessary to back the trailer all the way into the water so that the entire boat is floating, because the mechanical force applied by the launching assembly is sufficient to overcome frictional forces arising from the partial weight of the front of the boat on supporting members of the trailer. This permits the boat owner to keep the boat under control even in choppy launching conditions because the trailer maintains lateral control of the boat until the instant when the operating rod or actuator is extended, thus accelerating the boat away from the trailer and launching it. Safety and reliability are greatly enhanced because one person can operate the assembly from a distance while standing on dry concrete without the necessity for entering the wet zone or the water itself. The invention is particularly helpful for handicapped people with loss of use of limbs who for the first time can launch their boat without assistance.

DETAILED DESCRIPTION

In the description that follows, like parts will be given the same reference numeral so far as possible.

Figure 1:
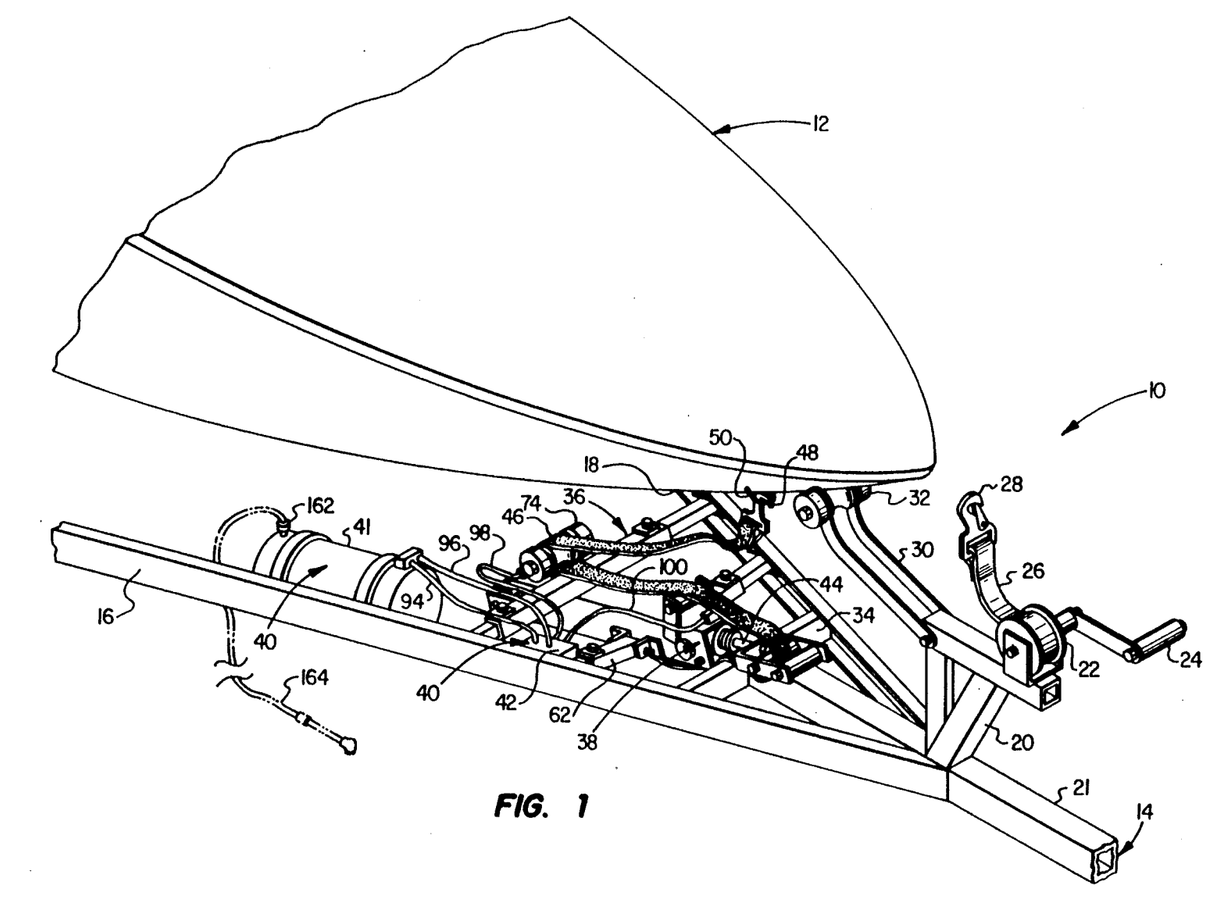
FIG. 1 is a cutaway perspective view of the first embodiment with the boat in the trailering position.

The first embodiment of the launching assembly is referred to generally by the reference numeral 10. In FIG. 1, the front portion of boat 12 is shown in the trailering position on the front portion of trailer 14 having spaced side members 16 and 18 which are normally C-shaped sections as indicated, which connect at a common point and run down along either side of the boat toward the rear portion where the trailer wheels are located. The boat is supported on the trailer by the usual rollers or roller bars or fabric-covered boards or combinations of conventional supports which are arranged in various ways by various manufacturers. Virtually all manufacturers, however, utilize the V-shaped formation shown in FIG. 1 for the side members.

A conventionally mounted vertical post member 20 is mounted on tongue 21 of the trailer where the ends of side members 16,18 come together. Mounted at the top of post 20 is conventional winch 22 having a handle 24 and a winch strap or rope 26 having a hook 28 at its end. Curved arms 30 are connected to a portion of post 20 to support a cushioned stop member 32 against which the prow of the boat is held by winch 22 when the boat is secured on the trailer for movement. Hook 28 is connected to an eye (not shown) on the prow of the boat. Trailer 14 has a lateral support 34 to which an end of tongue 21 is fixed. Additional lateral supports may connect the sides 16,18 aft of launching assembly 10.

Launching assembly 10 has an adjustable support structure 36 which may include both lateral and vertical adjustment adapted to fit varying dimensional distances between the side frames of different trailers. The launching assembly includes a drive means generally designated by reference numeral 38, which is mounted on the support structure. A power supply means generally designated by reference numeral 40 is connected to the control means 42 for supplying motive power to the drive means. Power supply means 40 includes an air compressor 90 as preferably housed within the housing of control means 42. Control means 42 is mountable on the trailer and operatively interconnected with the drive means and the power supply means for selectively operating the drive means by applying motive power to the drive means. Drive means 38 includes an extendable operating rod 44 which applies a launching force to a flexible member 46 having a hook member 48 on the end. Hook 48 is releasably connected to a laterally oriented eye member 50 fixed to the prow of the boat. Flexible member 46 in FIG. 1 is shown in a slack orientation for purposes of illustration.

Figure 2:
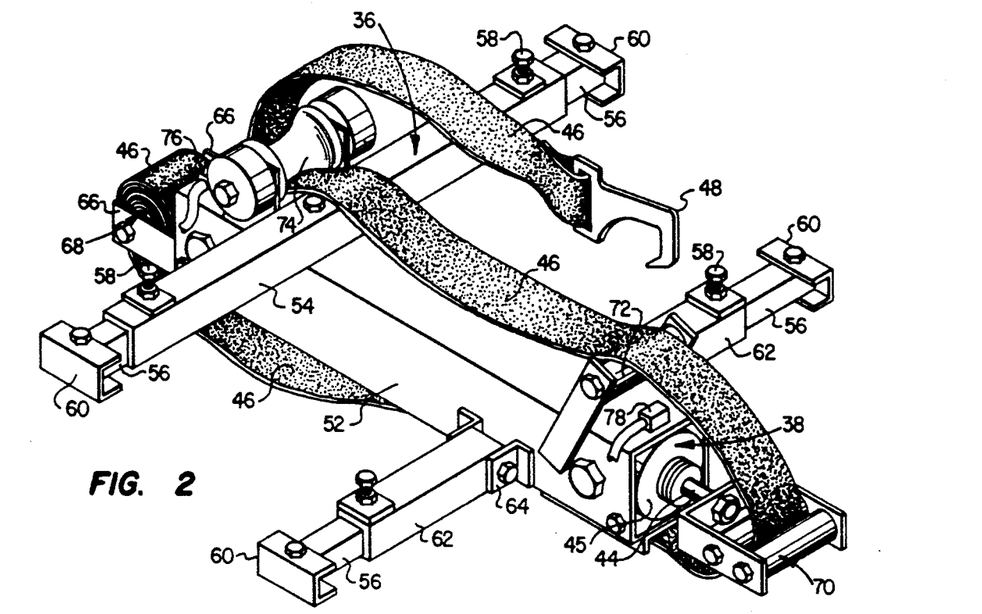
FIG. 2 is a perspective view of the launching assembly of FIG. 1 apart from the trailer showing the adjustable legs of the mounting frame to fit trailers of different size.

FIG. 2 shows the self-contained trailer mountable launching assembly apart from the trailer of FIG. 1. Support structure 36 has a longitudinal member 52 connected to a lateral member 54 having laterally extendable legs 56 that slide into lateral member 54 and may be adjusted to selected positions by fasteners 58. The ends of legs 56 are equipped with longitudinally extending feet 60 which are adapted to fit the inside of C-shaped channel members 16,18 when extended against the web of the channel and locked into position by fasteners 58. Forward of member 54, longitudinal member 52 has a pair of oppositely extending articulated arms 62 into which adjustable sliding legs 56 are fixed in position by another set of fasteners 58. The ends of legs 56 have feet 60 which also fit up against the web of the channels which form the sides of the trailer. Arms 62 are connected at a joint 64 from which they may be angled in a vertical direction as indicated in FIG. 1 to adjust the vertical orientation of the member 52 with respect to the trailer. This permits locating drive member 38 in the proper orientation and provides adjustment to clear any obstructions that may be created by various lateral supports on different trailer designs.

At the rear of member 52 is a pair of spaced apart brackets 66 to which is mounted a tensioning device 68 and a portion of flexible member 46 which is shown in the form of a strap. Tensioning device 66 may be a conventional automobile seat belt retractor of the kind which contains a coiled portion of a strap which may be pulled away to extend the strap if it is pulled slowly but which locks and holds tight if force is suddenly applied to the strap. Tensioning device 68 provides a convenient means for applying a small back tension to strap 46 which tends to ensure that hook 48, located on the other end of strap 46, remains in contact with eye 50 while the boat is being trailered or in preparation for launching.

Strap 46 runs underneath member 52 through a pair of rollers 70 connected to the operating end of operating rod 44 which is driven by operating cylinder 45 of which drive means 38 is comprised. Member 46 passes over standing roller 72 mounted on member 52 and around a rear mounted roller 74 mounted to member 54 over which flexible member 46 makes a change of direction. This makes it possible for operating rod 44 to extend in a direction opposite to the direction of launching. This arrangement also provides for a multiplication over a magnified distance which hook 48 and the end portion of strap member 46 moves in comparison to the distance the operating rod moves during launching. With tensioning device 68 locked, extension of operating rod 44 by cylinder 45 an amount equal to one unit causes the hook and the portion of strap 46 beyond roller 74 to move two units.

Alternately, the end of strap 46 could be clamped to the end of rod 44 by suitable clamping means without the use of tensioning means 68, in which case the unit movement of operating rod 44 and hook 48 would be equal and opposite over roller 74. Alternately still, tensioning device 68 can be fixed to the end of rod 44 in place of rollers 70 to reduce the amount of strap or rope needed for the flexible member. The multiplying system shown in FIG. 2 is preferred not only because it permits a shorter cylinder and occupies less space, but also because it allows the same unit to be manufactured where different strap lengths are required since the correct length of strap can simply be unwound from tensioning device 68 to reach the eye of a boat. Cylinder 45 is preferably a double-acting cylinder having input connection 76 and an input connection 78 for application of hydraulic or pneumatic pressure to provide motive power.

Figure 3:
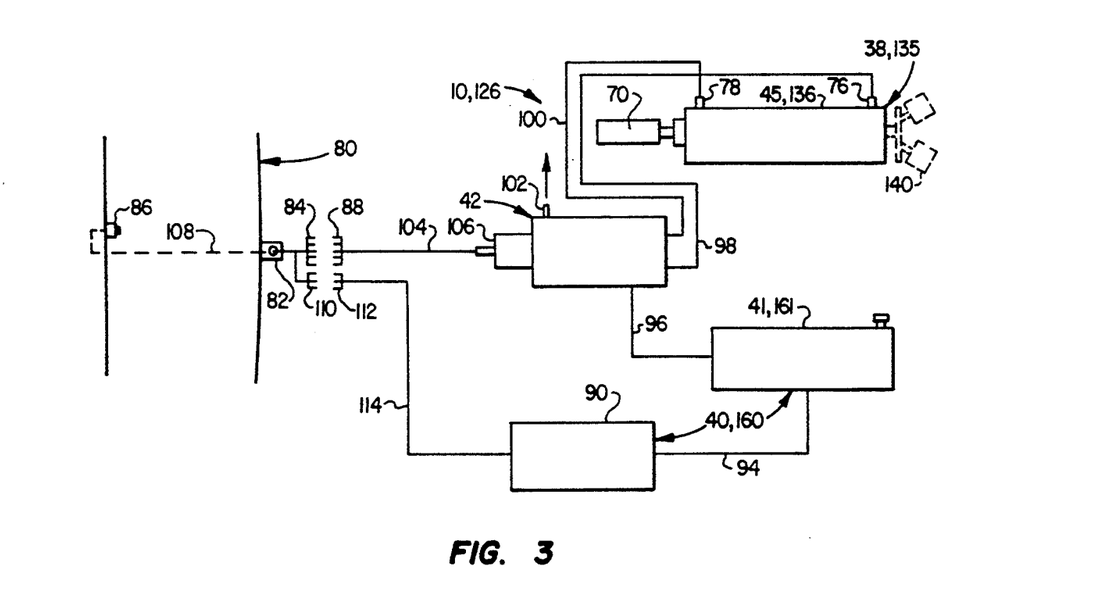
FIG. 3 is a schematic diagram showing the hook-up of the various components of the launching assembly of the first and second embodiments.

Schematically illustrated in FIG. 3 are the connections of the various units which make up the launching assembly. A towing vehicle schematically indicated as 80 has a hitch 82 and one or more trailer plugs 84,110. It has a dash-mounted switch 86. The trailer harness wiring plug is schematically indicated as plug 88 which connects to plug 84 on the vehicle from which the trailer lights and turn signals are powered and controlled.

The operation schematically illustrated in FIG. 3 begins with power supply means 40,160 which comprises electrically-operated air compressor 90 having an electrical connection line 114 and plug 112, connected to a separate plug 110 which is powered when the motor of the vehicle is running. The output of air compressor 90 is transferred via pressure line 94 to pressure vessel 41,161 which is connected through output pressure line 96 to control means 42. Compressor 90 is a small, portable, relatively inexpensive compressor operable with automotive battery voltage and equipped with a conventional pressure shut-off switch sensor which turns the compressor off when the pressure in vessel 41,161 reaches a desired amount. Vessel 41,161 has sufficient storage capacity at a desired pressure to operate at least one launching cycle which is all that is required. Control means 42 is an electrically operated five-port four-way valve which is connected through output pressure line 98 to input connection 76 of cylinder 45,136 and an alternate output pressure line 100 which is connected to pressure input 78 of cylinder 45,136. It also has an output port 102 for discharge of air to atmosphere.

In operation, the operator connects plugs 84 and 88, and if separate, plugs 110,112, after trailer 14,128 is hooked to towing vehicle 80. In the conventional manner when the ignition is turned on, power is available from the car's electrical system through plugs 84 and 88 to operate the trailer lights. One prong of plug 88 is connected through electrical line 104 to solenoid 106 that electrically operates the five port four-way valve of control unit 42. A corresponding prong on plug 84 is connected to another electrical line 108 which leads to control switch 86 preferably mounted in the cab of the vehicle. Another plug 110 is connected to the car's electrical system and its corresponding plug 112 is connected through electrical line 114 to air compressor 90 to provide power for the air compressor as soon as the ignition is turned on and the motor started.

The air compressor 90 begins operating and filling pressure vessel 41 or 161 as the vehicle is being moved toward the lake. Since there is a lot of time to fill the pressure vessel, the air compressor can be an inexpensive, lightweight compressor of low volumetric capacity. When the tank reaches the preselected pressure, a switch cuts the air compressor off. Air line 96 is closed off by control valve 42 so that the pressure is retained in tank 41,161. Solenoid 106 is in the non-activated position.

When the trailer of the first embodiment has been backed into the launching position, the tie-downs removed and the winch rope removed ready for launching, all the operator need do is push button 86 which activates solenoid 106 through lines 108 and 104. This changes the position of the four-way valve to connect air line 96 with air line 98 and air line 100 with discharge port 102 so that pressurized air from pressure vessel 41 can pass through input connection 76 against a piston inside cylinder 45 which moves operating rod 44 from the retracted trailering position to the extended position and applies the launching force to the boat through flexible member 46. Air trapped on the low pressure side of the piston inside cylinder 45 is released through the discharge port. The entire extension of the cylinder typically takes place over a short interval of time of the order of 1 second or less. The boat is accelerated in the launching direction away from the trailer. At the end of the stroke, hook 48 is still connected to eye 50. The boat is moving away from the trailer which automatically disengages the hook when it reverses, turns over and falls away by gravity as the boat continues to move away. Releasing control switch 86 turns solenoid 106 to the non-activated position and the four-way valve applies the remaining pressure in tank 41 through line 96 to line 100 where it enters cylinder 45 at input port 78. Simultaneously the valve opens line 98 to output port 102 so that air from the low pressure side of the piston can escape while the piston of cylinder 45 retracts the operating rod or actuator rod back to the retracted position. Simultaneous with the change in the four-way valve is the closing of line 96 so that compressor 90 can rebuild the pressure in vessel 41.

Figure 4A:
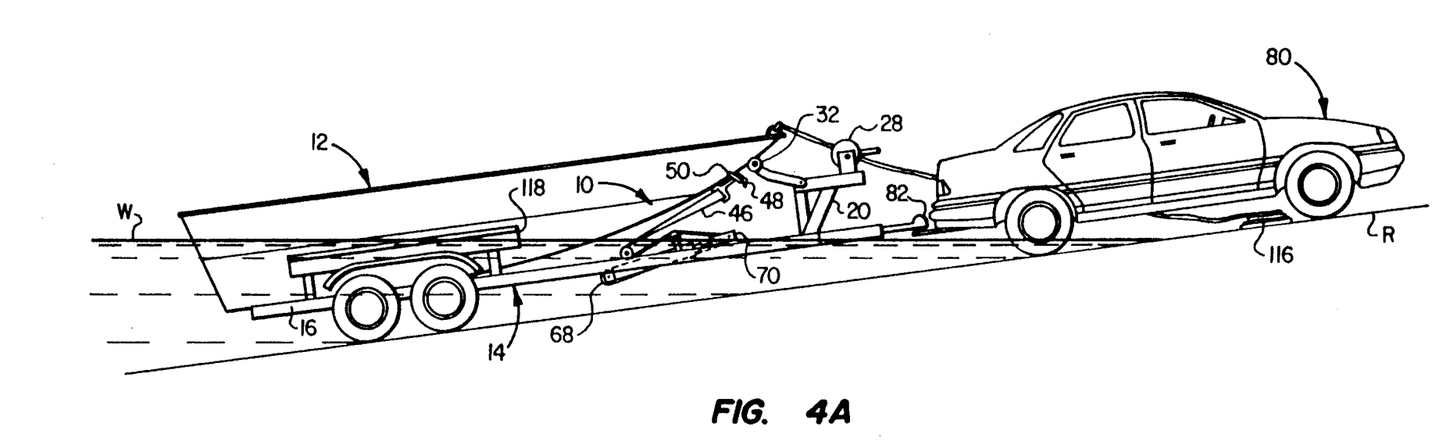
FIG. 4A is a side elevation of a boat trailer and tow vehicle in launching position on a ramp before launching has been initiated.
Figure 4B:
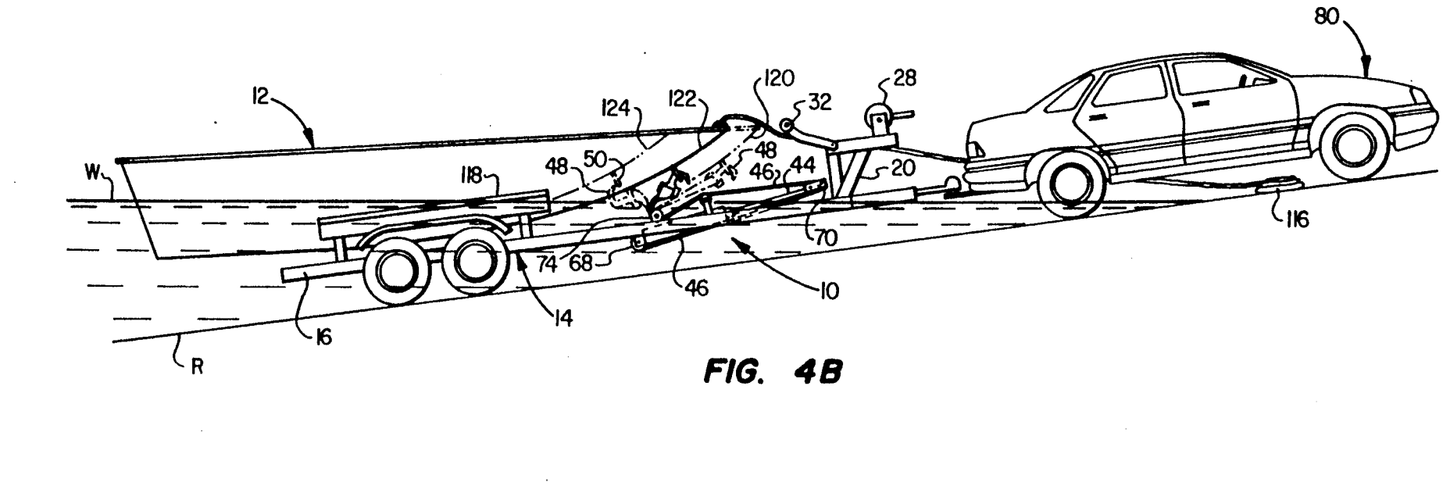
FIG. 4B is a side elevation of the combination of FIG. 4A with the launching operation under way, showing disengagement of the hook member.

In FIGS. 4A and 4B, the process of launching a boat from a trailer with the aid of the launching assembly of FIGS. 1-3 is illustrated. In FIG. 4A pulling vehicle 80 has been connected to hitch 82 of typical trailer 14 which is adapted for hauling boat 12. In FIG. 4A the trailer is being backed into the water W by means of vehicle 80 from ramp R. The unit 10 has been mounted at the front of the trailer between the side members 16,18 as indicated in FIG. 1. Open hook 48 has been placed over a portion of eye 50 laterally mounted on the prow of the boat. Flexible member 46 is slightly tensioned by means of tensioning device 68. The boat prow is still in the trailering position with its prow in contact with stop member 32, winch 28 having been disconnected in preparation for launching. Control rope 116 has been connected to another eye on the front of the boat and is shown coiled up by the cab of the vehicle on the operator's side. The boat is still in the trailering position, but the stern of the boat is floated off the trailer in the manner indicated in FIG. 4B with the prow of the boat still in contact with stop member 32 and the front portion of the boat still frictionally engaged by a front portion of supports 118 so that the trailer maintains partial contact with the boat to control lateral movement, even if there is some wave action at the launch site.

Since the launching assembly forcibly applies a launching force to the boat in a launching direction, the trailer is not backed as far into the water as in conventional launching procedures whereby the boat has to be completely floated before it can be pushed off the trailer by hand. With the boat longitudinally oriented in respect to the trailer as in FIG. 4A, but with the stern raised and floated as in FIG. 4B, the operator triggers the launching assembly, preferably from the cab of the vehicle, by activating control switch 86. As operating rod 44 moves opposite the launching direction, under the influence of cylinder 45, the prow of the boat assumes an intermediate dotted line position 120. The sudden thrusting of the operating rod in the direction of the vehicle applies a sharp force to tensioning device 68 which locks as though the end of flexible member 46 were fixed at device 68. The movement pulls flexible member 46 around roller 74 and applies force in the launching direction to hook member 48. The boat is accelerated away from trailer 14 until it reaches a position designated 122 where the prow of the boat is shown in solid outline. This illustrates the position at the maximum extension of the operating rod 44. The boat is now accelerated the maximum extent in the launching direction away from the vehicle. As the boat continues to move to dotted outline prow position 124, member 48 is reversed and turned over to fall out of eye 50 by gravity as the boat continues to move. This process is aided by immediate retraction of the cylinder after the extension stroke which loosens flexible member 46. The boat continues to move away from the trailer in the launching direction now completely unhooked except for control rope 116 which plays out as the boat moves away. The operator then takes control rope 116 and uses it in combination with the wind or current to position the boat near the shore so that he will be able to enter the boat and the boat will not block the ramp to the detriment of other users. The operator then is free to move the vehicle and trailer away from the ramp to a parking area. It should be noted that although launching assembly 10 is likely to be under water, the cylinder, control unit and power supply unit are all tightly sealed so that no water can enter. They are waterproof. Some variation of the pointed tip of the hook may be desirable to insure that the hook falls free. A small barb like projection can help hold it in place, somewhat similar to the barb on a fish hook.

Figure 5:
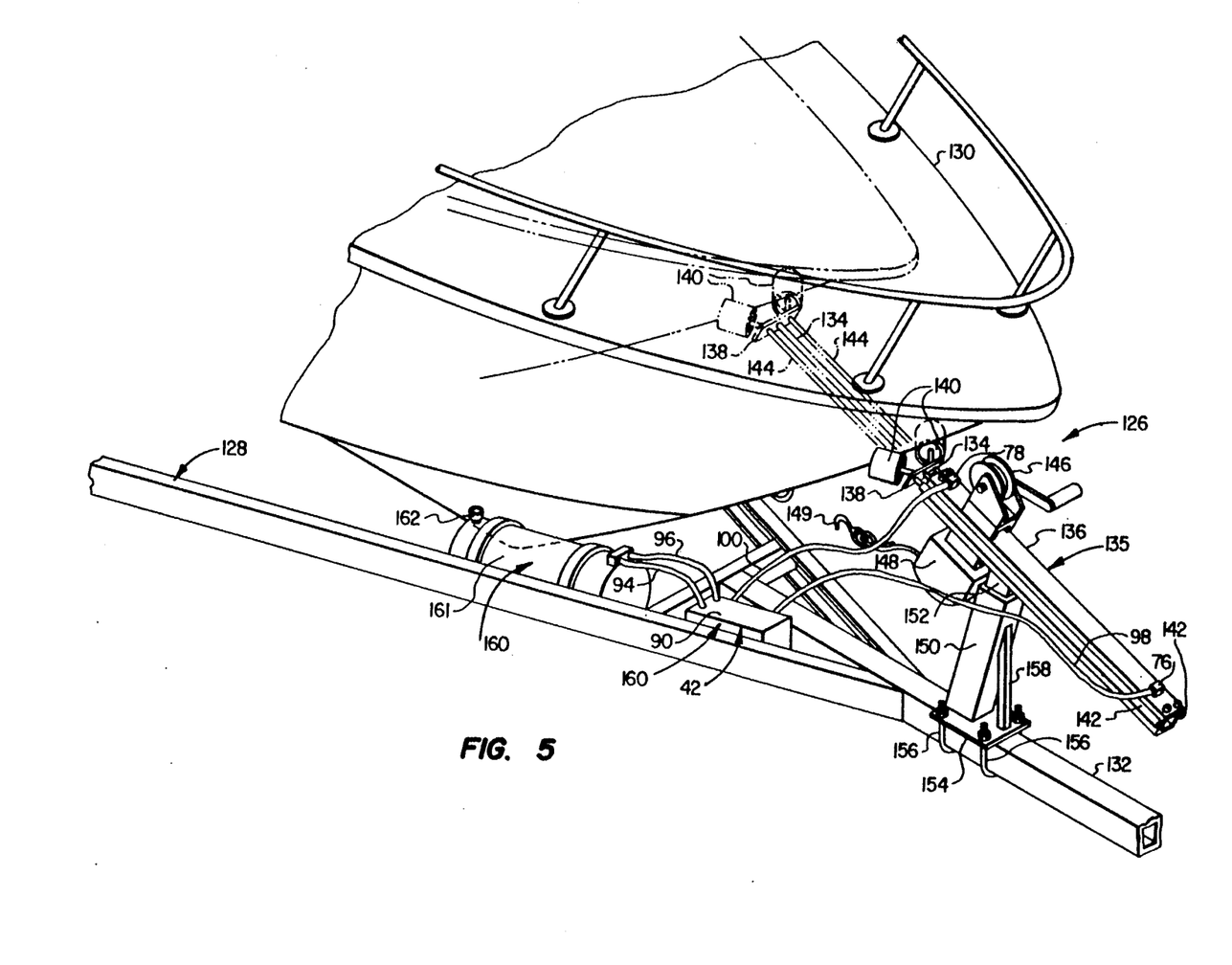
FIG. 5 is a perspective view of the second embodiment.

The second embodiment of the invention is illustrated in FIG. 5 which shows a launching assembly 126 typically installed on a larger trailer 128 and larger boat 130 than in FIG. 1. Trailer 128 is still the type adapted to support a boat until the trailer is partially submerged and the boat at least partially floated off the trailer during launching in like manner to that described in connection with FIGS. 1-4B. Assembly 126 is mounted at the front part of trailer 128, here on tongue 132. Post 150 having base 154 and support 158, has a pair of clamps 156 which hold it securely on the trailer tongue in an upright position. Post 150 preferably has an adjustable stem 152 which can be locked at a desired vertical height above tongue 132. The adjustability of stem 152 is convenient for adjusting the unit 126 to accommodate different trailer and boat configurations.

Mounted on post 150 via stem 152 is an actuating cylinder and housing generally designated 135 with an internal cylinder 136 oriented in the longitudinal direction and preferably angled upwardly with respect to the prow of the boat. Actuating cylinder 136 is hidden in housing 135 but when fixed in place it is a conventional hydraulic or air cylinder which is operated by fluid pressure. It is a double-acting cylinder having fluid inlets 76 and 78 respectively for extension and retraction of a retractable actuator 134 which is extensible by application of pressure through connection 76 of pressure line 98. Cylinder 136 is retractable by application of pressure through input connection 78 connected to pressure line 100. The hookup of the components is the same as indicated in FIG. 3 except that the orientation of the cylinder is reversed as indicated by the dotted lines and moves in the same direction as the boat.

Retractable actuator 134 has a fixed end 138 to which is connected the ends of a pair of guide rods 144. Guide rods 144 parallel retractable actuator 134 on either side of it and slide in opposed guide members 142 along either side of actuating cylinder and housing 135. Cushioning means 140 is connected to end 138 of retractable actuator 134. Cushioning means 140 comprises a pair of laterally spaced knobs which contact the prow of the boat on either side of the central chine. The solid representation in FIG. 5 show the trailering position whereby cushioning means 140 of retracted actuator 134 serves as a stop to define the trailering position in contact with the prow of a boat when the actuator is retracted. The dotted line representation shows how the launching force is applied upwardly and outwardly in a longitudinal launching direction by cushioning means 140 on the end of actuator 134 driven by actuating cylinder 136. The housing 135 of actuating cylinder 136 is conveniently adapted to support either a hand winch 146 or an electrically operated winch 148 having hook 149. Housing and cylinder 135 make an ideal support for a winch which is used to pull the boat back onto the trailer against cushioning means 140 which serves as a stop.

Actuating cylinder 36 drives the actuator to the extended position shown in a launching direction in direct contact with the boat prow. Since there is no multiplying effect, the stroke of cylinder 136 is typically about twice that of the first embodiment. Launching unit 126 is provided with power supply means 160 mounted on the trailer supplying motive power to actuating cylinder 136 to drive actuator 134 in response to control unit 42. Power supply unit 160 is given a different reference number than power supply 40 of the first embodiment mainly because the tank is larger. It has same components as previously described in connection with FIG. 1. Power supply means 160 includes the air compressor 90 in the housing for control unit 42. Pressure vessel 161 of means 160 is mounted to the trailer frame, having input and output lines 94,96 illustrated in FIG. 3 which are connected to air compressor 90 inside the compartment of control valve 42. Conveniently connected in fluid communication to tank 161 is connection 162 for removable air hose 164 of FIG. 1 which conveniently utilizes pressure in tank 41,161 to inflate the tires of the trailer or towing vehicle. Actuating cylinder 136 is typically much larger than cylinder 45 depending on the size of the boat to be moved.

Air compressor 90 is wired through the trailer wiring harness or through a separate plug such that it is activated when the ignition is turned on. It automatically stops when preselected pressure is obtained in pressure vessel 161. Control unit 42 is wired up through the trailer wiring harness to switch 86 inside the vehicle which remains in the open position until ready to launch. The boat is ready for launching when the trailer has been backed into the water with the front portion of the boat still supported by a portion of the trailer. The operator pushes button 86 which pushes boat 130 up and out away from and off of the trailer with rapid acceleration indicated by the dotted line position in FIG. 5. When switch 86 is released, control unit 42 reverses the air pressure to provide pressure from tank 161 through line 100 and inlet 78 to retract cylinder 136 and rod 134 back to the initial trailering position. The unpressurized side of the cylinder is vented by the valve member inside control unit 42 through port 102 as indicated in FIG. 3.

In the best mode, the following table indicates how an appropriate cylinder may be selected in order to achieve a desired launching velocity of the boat of about six mph away from the trailer. It will be noted that the larger boats are very heavy and require very substantial launching forces which are easily available with appropriate selection of the cylinder size, stroke and operating pressure.

TABLE

| Cylinder Selection to Produce a Launching Velocity of About 6 mph | | | | | | |
|---|---|---|---|---|---|---|
| Boat | Weight | Launching Force Required | Cylinder Diameter | Operating Pressure | Stroke | Force Produced | Estimated Time |
| 25 foot Bayliner | 4200 pounds | 1300 pounds | 4 inch | 100 psi | 36 inches | 1260 pounds | 1.5 seconds |
| 29 foot Sea Ray | 5700 pounds | 1800 pounds | 5 inch | 100 psi | 36 inches | 1960 pounds | 2 seconds |
| 30 foot Sea Ray | 7200 pounds | 2240 pounds | 6 inch | 100 psi | 36 inches | 2290 pounds | 2.5 seconds |
| 39 foot Sea Ray | 15,000 pounds | 4700 pounds | 8 inch | 100 psi | 36 inches | 5000 pounds | 3.5 seconds |

The table provides information concerning typical boats and cylinder selection appropriate to the size of the boat. It is applicable to the second embodiment which is best suited for use on large boats. The estimated time is a rough estimate of the time for extension and retraction of the cylinder. Extension is believed to be about half of the estimated time.

It is preferred that air compressor 90 be adjustable to different predetermined maximum operating pressure for flexibility in adjusting the force to launch a particular sized boat. It is thought to be desirable to use operating pressure of up to 200 psi for cylinders with a bore over 6 inches. The flow restrictor can be used in appropriate location in the lines leading from the pressure vessel to the cylinder to increase the time interval over which the launching force is applied to the boat, if the natural flow of the system produces the force too rapidly. In an exemplary system, a cylinder with a 4" bore needs about a 4 gallon air supply tank. The air tank is preferably sized to retain about ⅔ of its original pressure after the cylinder is fully extended to provide sufficient pressure for retraction of the double acting cylinder. Retraction occurs immediately when the switch is disengaged by switching the valve inside control unit 42.

With respect to the first embodiment, an 18" stroke cylinder with a diameter of about 2-4" is selected for a smaller boat, commonly known as a "bass boat". An air tank having a capacity of about 450 cubic inches can be mounted on the trailer frame and is suitable for a 4" cylinder having an 18" stroke. The control unit for either embodiment could be a conventional five port four-way electrically operated valve with a 12-volt DC operator. The valve is described as a 2.0 CV valve which refers to a flow coefficient factor that is determined by the Natural Fluid Power Association (NFPA). In both embodiments, the system is selected to produce a desired launching velocity of about 6 miles per hour. Various types of trailer wiring harness plugs provided by different manufacturers have 4 to 6 pin plugs. Exemplary plugs are indicated in FIG. 3. The system should be weather tight and weatherproof so that water does not interfere with the operation.

It is also contemplated that the cylinder of either embodiment could be a conventional spring retractable single acting cylinder which would need only a simple valve member in control unit 42 to apply on command, pressure to one end of the cylinder to extend it and relieve the pressure whereupon a spring either inside the cylinder or connected to it would draw it back to the retracted position.

It should be noted that control switch 86 could be mounted in a number of places including the trunk or even on the trailer itself or on an extension which the operator could pull out in order to stand away from the trailer so he doesn't risk getting wet.

It is also within the contemplation of the invention that the cylinder of the first embodiment could be reversed to move in the launching direction but that is considered undesirable because it would be located farther back and would be positioned lower to avoid hitting the boat which puts it at a reduced ground clearance with danger of hanging up on obstructions. The advantage of the device of FIG. 1 is that it can be positioned higher on the trailer and more to the front where it does not interfere with the boat and has plenty of road clearance.

A hydraulic system could be used despite expense, weight, space and operating disadvantages and so it is within the contemplation of the invention. It may be advantageous for large boats. The cylinder and hose connections would operate with hydraulic fluid. The power supply source would be a suitable hydraulic pump and reservoir of sufficient capacity to operate the cylinder along with an electrically operated hydraulic valve to operate a double acting cylinder in place of compressor 90 and tank 41,161. Special battery operated portable hydraulic pumps are available which require a special battery that could be trailer or vehicle mounted or operated from a truck vehicle that has a separate hydraulic system, tied into the trailer mounted cylinder with a detachable hose and valves to prevent loss of hydraulic fluid. The hydraulic pump has to be turned on before the control switch can be used to extend the cylinder.

I claim:

1. A self-contained trailer mountable marine boat launching assembly to be carried by a trailer for hauling a boat to a launch site behind a pulling vehicle, the launching assembly being operable to apply a launching force to the prow of a boat after said trailer has been backed into launching position, the launching assembly in combination comprising:

a support structure mountable near the front of a trailer adapted to haul a boat in a trailering position on the trailer and permit launching of a boat off the trailer;

a drive means having an extendable operating rod mounted on the support structure for applying a launching force over a distance to the prow of a boat, wherein the drive means has a member having an end releasably connectable to the prow of a boat, adapted to be driven in a launching direction by the operating rod a magnified distance which exceeds the corresponding distance over which the operating rod moves in driving said member so that the launching force can be applied over a launching distance greater than the operating distance of the operating rod;

a power supply means connected to said drive means for supplying motive power to said drive means; and a control means mountable on said trailer, operatively interconnected with said drive means and power supply means, for selectively operating said drive means by applying said motive power to said drive means to apply a launching force over a distance in a launching direction to the prow of a boat in response to a control switch which operates the control means.

2. The self-contained trailer mountable launching assembly of claim 1 further including a boat trailer on which said assembly is mounted.

3. The self-contained boat launching assembly of claim 1 wherein the combination includes a control switch operatively connected to said control means whereby said launching force can be applied by said drive means to the prow of a boat by operation of said control switch.

4. A self-contained trailer mountable marine boat launching assembly to be carried by a trailer for hauling a boat to a launch site behind a pulling vehicle, the launching assembly being operable to apply a launching force to the prow of a boat after said trailer has been backed into a launching position, the launching assembly in combination comprising:

a support structure mountable near the front of a trailer adapted to haul a boat in a trailering position;

a drive means mounted on the support structure for applying a launching force over a distance to the prow of a boat wherein the drive means has an extendable operating rod which moves an operating distance in a direction opposite of the launching direction to apply the launching force to the prow of a boat;

a power supply means connected to said drive means for supplying motive power to said drive means; and control means mountable on said trailer, operatively interconnected with said drive means and power supply means, for selectively operating said drive means by applying said motive power to said drive means to apply a launching force over a distance in a launching direction to the prow of a boat in response to a control switch which operates the control means.

5. The self-contained boat launching assembly of claim 4 wherein the drive means includes a flexible member and the operating rod has an operating end adapted to apply the launching force to the flexible member which transfers the launching force applied by the drive means to the flexible member which is attachable releasably to the prow of a boat.

6. The self-contained boat launching assembly of claim 5 wherein the launching force is applied over a distance to a boat by the flexible member, said distance being greater than the operating distance of the operating rod whereby the movement of the operating rod is a fraction of the movement of the flexible member during launching.

7. The self-contained boat launching assembly of claim 6 wherein the fraction is one half.

8. The self-contained boat launching assembly of claim 5 wherein the flexible member has a hook member on its end which is engageable with an eye member on the prow of a boat, the hook member being automatically disengageable from said eye member upon movement of a boat in the launching direction after application of the launching force to the boat by the flexible member.

9. The self-contained boat launching assembly of claim 8 wherein the drive means includes a tensioning device connected to the flexible member which supplies a tensioning force sufficient to prevent slack from developing in the flexible member before the launching force is applied so that the hook member remains engaged with the eye member.

10. The self-contained boat launching assembly of claim 9 where the tensioning device is a spring loaded reel around which a portion of the flexible member is wound.

11. A self-contained trailer mountable marine boat launching assembly to be carried by a trailer for hauling a boat to a launch site behind a pulling vehicle, the launching assembly being operable to apply a launching force to the prow of a boat after said trailer has been backed into launching position, the launching assembly in combination comprising:
- a support structure mountable near the front of a trailer adapted to haul a boat in a trailering position on the trailer and permit launching of a boat off the trailer;
- a drive means mounted on the support structure for applying a launching force over a distance to the prow of a boat;
- wherein the drive means includes an operating cylinder having an extendable operating rod which provides said launching force upon extension of the rod;
- a power supply means connected to said drive means for supplying motive power to said drive means; and
- a control means mountable on said trailer, operatively interconnected with said drive means and power supply means, for selectively operating said drive means by applying said motive power to said drive means to apply said launching force over a distance in a launching direction to the prow of a boat in response to a control switch which operates the control means.

12. The self-contained boat launching assembly of claim 11 wherein the power supply means includes a pressure vessel having sufficient capacity to supply operating fluid to said operating cylinder over at least one extension cycle.

13. The self-contained boat launching assembly of claim 12 wherein said control means interconnects said pressure vessel with said operating cylinder.

14. The self-contained boat launching assembly of claim 13 further including a flow restrictor which tends to control the flow of pressurized fluid between the pressure vessel and the operating cylinder while the launching force is being applied.

15. The self-contained boat launching assembly of claim 13 wherein the power supply means includes an air compressor for filling the pressure vessel to a preselected operating pressure to provide said motive power to the drive means sufficient to apply the launching force to a boat.

16. The self-contained boat launching assembly of claim 15 wherein said air compressor is an electrically operated compressor electrically connected to a wiring harness of said trailer and automatically powered up in response to the wiring harness of said trailer being plugged into a corresponding plug on a vehicle, which is electrically activated in response to said vehicle being started.

17. The self-contained boat launching assembly of claim 16 further including a control switch remotely locatable with respect to a trailer on which said assembly is mountable so that it can operate the drive means through the control means from a distance without the necessity of an operator entering the water at a launching site.

18. The self-contained boat launching assembly of claim 13 wherein the operating cylinder is a double acting cylinder and said control means is adapted to selectively extend said operating rod to apply the launching force and retract said operating rod after the launching force has been applied in response to operation of said control switch.

19. The self-contained boat launching assembly of claim 18 wherein the control means is an electrically operated five-port four-way valve which operates to extend and retract the operating rod of the operating cylinder in response to operation of said control switch.

20. The self-contained boat launching assembly of claim 19 further including said control switch, said switch being adapted for mounting within a vehicle that pulls said trailer and operatively connected to the electrical power system of a vehicle.

21. In the combination of a trailer and boat launching assembly for carrying to a launch site a boat in a trailering position wherein the trailer is adapted to support a boat until the trailer is partially submerged and the boat at least partially floated off the trailer during launching and can be floated onto the trailer to the trailering position again after launching, comprising;
- a launching assembly mountable at the front of a trailer for selectively applying a launching force to the prow of a boat still in the trailering position after the boat is floated off the back of the trailer in response to backing the trailer into the water, including:
- a retractable actuator having an end provided with means for contacting the prow of a boat on the trailer in the trailering position said means for contacting the retracted actuator serving as a stop to define the trailering position in contact with the prow of a boat when the actuator is retracted;
- an actuating cylinder for driving the retractable actuator to an extended position in a launching direction away from the cylinder, thereby applying a launching force with the means for contacting the prow of a boat over a distance during extension of the retractable actuator;
- a power supply means for applying motive power to the actuating cylinder to drive the actuator in response to operation of a control unit; and
- a control unit interconnecting the power means and actuating cylinder which selectively applies power from the power supply means to actuating cylinder to generate launching force on the actuator in response to selective operation of an operating switch of the control unit;

whereby a boat partly floated up off the trailer but still in the trailering position can be accelerated away from the trailer in a launching direction by a launching force applied to the prow by said end of the retractable actuator.

22. The combination of claim 21 further including a boat trailer having said launching assembly mounted thereon wherein said launching force is applied for about 1.5–3.5 seconds to provide a launching velocity of about six miles per hour to a boat being launched.

23. The combination of claim 21 wherein the actuating cylinder is operated by pressurized fluid being selectively applied by the power supply means through the control unit.

24. The combination of claim 23 wherein the power supply means includes a pressure producing means mounted on the trailer to provide said motive power by providing pressurized fluid to the actuating cylinder.

25. The combination of claim 24 wherein the power supply means includes a vessel of sufficient capacity to store the fluid needed to operate the actuating cylinder to drive the actuator to its extended position.

26. The combination of claim 25 wherein said vessel is a pressure vessel for compressed air.

27. The combination of claim 26 wherein a flow restrictor tends to control the flow of pressurized fluid between the pressure vessel and the actuating cylinder while the launching force is being applied.

28. The combination of claim 26 wherein the power supply means includes an air compressor for filling the pressure vessel to a preselected operating pressure to provide said motive power sufficient to apply the launching force to a boat.

29. The combination of claim 28 wherein said control unit or said actuating cylinder contains a flow restrictor which tends to control the flow of pressurized fluid between the pressure vessel and the actuating cylinder while the launching force is being applied.

30. The combination of claim 28 wherein said air compressor is an electrically operated compressor electrically connected to a wiring harness of said trailer and automatically powered up in response to the wiring harness of said trailer being plugged into a corresponding plug on a vehicle, which is electrically activated in response to said vehicle being started.

31. The combination of claim 30 further including a control switch remotely locatable with respect to a trailer on which said assembly is mounted so that it can operate the actuating cylinder through the control unit from a distance without the necessity of an operator entering the water at a launching site.

32. The combination of claim 31 wherein said control switch is adapted for mounting within a vehicle that pulls said trailer and operatively connected to said vehicle electrical power system.

33. A boat launching assembly for a boat trailer adapted for carrying a boat in a normal trailering orientation between launch sites, the boat launching assembly comprising:

an actuator mountable at the front of a boat trailer, having an actuator rod movable in response to a power unit between an extended operating position, being retractable with respect to the actuator to a retracted traveling position, the end of the actuator rod being adapted to provide a launching force in a launching direction to a flexible member in contact with the end of the actuator rod when a boat is positioned on a trailer in a normal trailering orientation at a launch site;

a power unit connected through a control unit to the actuator to supply motive power to the actuator;

a flexible member driven by the actuator rod whereby the launching force is applied to the boat by the flexible member; and a control unit operatively interconnecting the power unit and the actuator having a first operating position which supplies motive power from the power unit to the actuator to move the actuating rod to the extended operating position and a second operating position which allows the actuating rod to retract to the traveling position.

34. The boat launching assembly of claim 33 wherein the combination includes the trailer on which said launching assembly is operatively mounted.

35. The boat launching assembly of claim 33 wherein the assembly includes said flexible member driven by the actuator rod having a hook member receivable by an eye member on the prow whereby the launching force is applied to the boat.

36. The boat launching assembly of claim 35 wherein the hook member is automatically released from an eye member on the boat after the launching force has been applied.

37. The boat launching assembly of claim 36 wherein the movement of the boat in the launching direction after application of the launching force causes the hook member to release from the boat.

38. The boat launching assembly of claim 37 wherein the flexible member is adapted to the actuator rod with a roller means that allows the flexible member and hook to move a multiple of the distance that the actuator rod moves from the retracted to the extended position.

39. The boat launching assembly of claim 38 wherein the operating rod moves to the extended position to apply the launching force on the flexible member, in a direction opposite of the launching direction.

40. The boat launching assembly of claim 39 wherein the flexible member includes a tensioning device which locks one end of the flexible member when sudden force is applied to the flexible member by the actuating rod.

41. The boat launching assembly of claim 33 wherein a switch selectively sets the control unit to the first operating or the second operating position whereby a launching force can be provided to a boat by the actuator rod moving from its traveling position to its extended position at a launch site in response to said switch, to launch the boat away from the trailer.

42. A method of self-launching a boat at a launching ramp from a carrying and launching trailer pulled by a vehicle, comprising the steps of:

providing a boat launching assembly mounted on the trailer, the boat launching assembly having an actuating cylinder with an actuating rod movable from a retracted to an extended operating position and adapted to apply a launching force to the prow of a boat;

backing the trailer into the water at a launching ramp to float the stern off the trailer; and launching the boat by causing the cylinder rod to extend to apply a launching force in a launching direction to the boat, sufficient to free the boat from the trailer by accelerating the boat in the launching direction, wherein said actuating cylinder is connected to a tank having a supply of fluid under pressure and the step of causing the cylinder rod to extend is accompanied by the step of releasing fluid from the tank into the cylinder.

43. The method of claim 42 wherein the launching assembly includes said actuating cylinder being operated by pressurized air and said tank having a supply of air under pressure connected to the cylinder and said step of causing the cylinder rod to extend is accompanied by the step of releasing air from said tank into said cylinder.

44. The method of claim 43 wherein the launching assembly provided includes a control valve connecting the tank with the cylinder and the step of releasing the air under pressure from the tank into the cylinder includes the step of operating the control valve from a distance.

45. The method of claim 44 wherein the control valve provided is electrically operated and connected through a wiring harness to a switch on a vehicle towing the trailer and the step of operating the control valve includes the step of throwing the switch.

46. The method of claim 45 wherein the step of backing the trailer into the water at the launch site until the stern is floated includes the step of leaving a forward part of the boat partially supported by a forward part of the trailer to prevent lateral movement of the boat in preparation for the launching step.

47. The method of claim 45 wherein the cylinder is provided with an actuating rod having a cushioning means on the end which extends, the step of causing the cylinder rod to extend includes the step of pressing the cushioning means against the prow of the boat to apply the launching force while the cylinder rod is extending.

48. The method of claim 45 wherein the cylinder actuating rod is provided on the end which extends with an end adapted to apply launching force to a flexible member having a hook member releasably connectable to the prow of the boat, wherein the step of causing the cylinder rod to extend includes the step of applying the launching force with the hook of the flexible member while the cylinder rod is extending.

49. The method of claim 48 wherein the step of applying the launching force to the prow of the boat is followed by automatically releasing the hook member after the launching force has been fully applied.

50. The method of claim 49 wherein the step of applying the launching force to the flexible member includes the step of causing the flexible member to move a distance which is greater than the distance the operating rod is extended, to apply the force over a longer distance.

51. The method of claim 49 where the step of applying the launching force to the flexible member includes the step of causing the flexible member to move a distance which is twice the distance the operating rod is extended during application of the launching force to the boat.

52. The method of claim 51 wherein the step of causing the cylinder rod to extend includes the step of causing the cylinder rod to extend in a direction which is opposite of the launching direction.

53. A self-contained trailer mountable boat launching assembly for a trailer which carries to a launch site a boat in a trailering position wherein the trailer is adapted to support a boat until the trailer is partially submerged and the boat at least partially floated off the trailer during launching and can be floated onto the trailer and returned to the trailering position again after launching;
- a launching assembly mountable at the front of a trailer for selectively applying a launching force to the prow of a boat still in the trailering position after the boat is floated off the back of the trailer in response to backing the trailer into the water, the launching assembly including:
- an extendable actuator rod having an end provided with means for applying a launching force to the prow of a boat carried on the trailer in the trailering position;
- a pressure operated actuating cylinder for driving the actuator rod to an extended position in a launching direction, thereby applying a launching force with the means for applying a launching force to the prow of a boat over a distance during extension of the actuator rod;
- a pressure supply for applying motive power to the actuating cylinder to drive the actuator rod in response to operation of a control unit; and
- a control unit interconnecting the pressure supply and actuating cylinder which selectively applies pressure from the pressure supply means to the actuating cylinder to generate launching force on the actuator rod in response to selective operation of the control unit;
- whereby a boat partly floated up off the trailer but still in the trailering position can be quickly accelerated away from the trailer in a launching direction by a launching force applied to said prow through the end of the actuator rod.

54. The combination of claim 53 wherein said actuating cylinder is sized to produce a launching velocity of about six miles per hour to said boat.

55. The combination of claim 53 further including a boat trailer having said launching assembly mounted thereon.

56. The self-contained boat launching assembly of claim 53 wherein said extendable operating rod moves an operating distance in a direction opposite of the launching direction to apply said launching force to the prow of a boat.

* * * * *